United States Patent

[11] 3,610,358

| [72] | Inventor | Walter H. Korff<br>449 N. Lamer, Burbank, Calif. 91506 |
| --- | --- | --- |
| [21] | Appl. No. | 843,957 |
| [22] | Filed | July 23, 1969 |
| [45] | Patented | Oct. 5, 1971 |

[54] CYCLE CAR
14 Claims, 6 Drawing Figs.

| [52] | U.S. Cl. | 180/25 R,<br>280/96, 280/150 C |
| --- | --- | --- |
| [51] | Int. Cl. | B62d 61/06 |
| [50] | Field of Search | 180/25, 11,<br>12, 26, 27; 280/96, 150 C |

[56] References Cited
UNITED STATES PATENTS

| 1,488,037 | 3/1924 | Fehr | 180/25 |
| --- | --- | --- | --- |

FOREIGN PATENTS

| 178,544 | 10/1953 | Austria | 180/25 |
| --- | --- | --- | --- |
| 545,049 | 6/1956 | Italy | 180/25 |
| 1,158,965 | 6/1958 | France | 180/25 |

*Primary Examiner*—Kenneth H. Betts
*Attorney*—Shlesinger, Arkwright and Garvey

ABSTRACT: A three-wheel convertible car has a forebody having a front crossframe, a centerline frame, and a rollbar frame, which is bolted to the front of a standard two-wheel motorcycle frame from which the front wheel and front fork have been removed.

PATENTED OCT 15 1971 3,610,358

INVENTOR.
WALTER H. KORFF

BY

Schlesinger, Arkwright & Garvey
ATTORNEYS

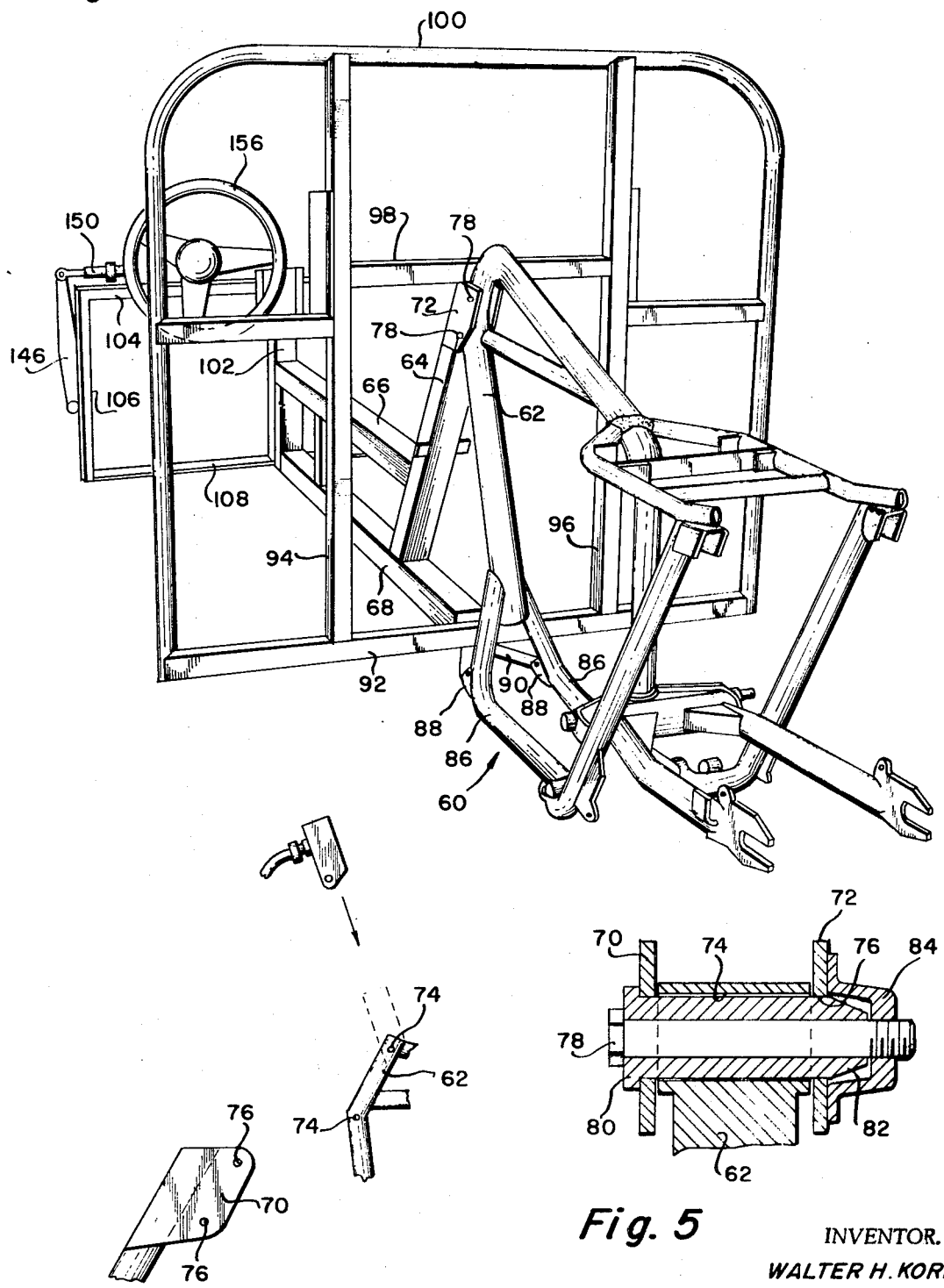

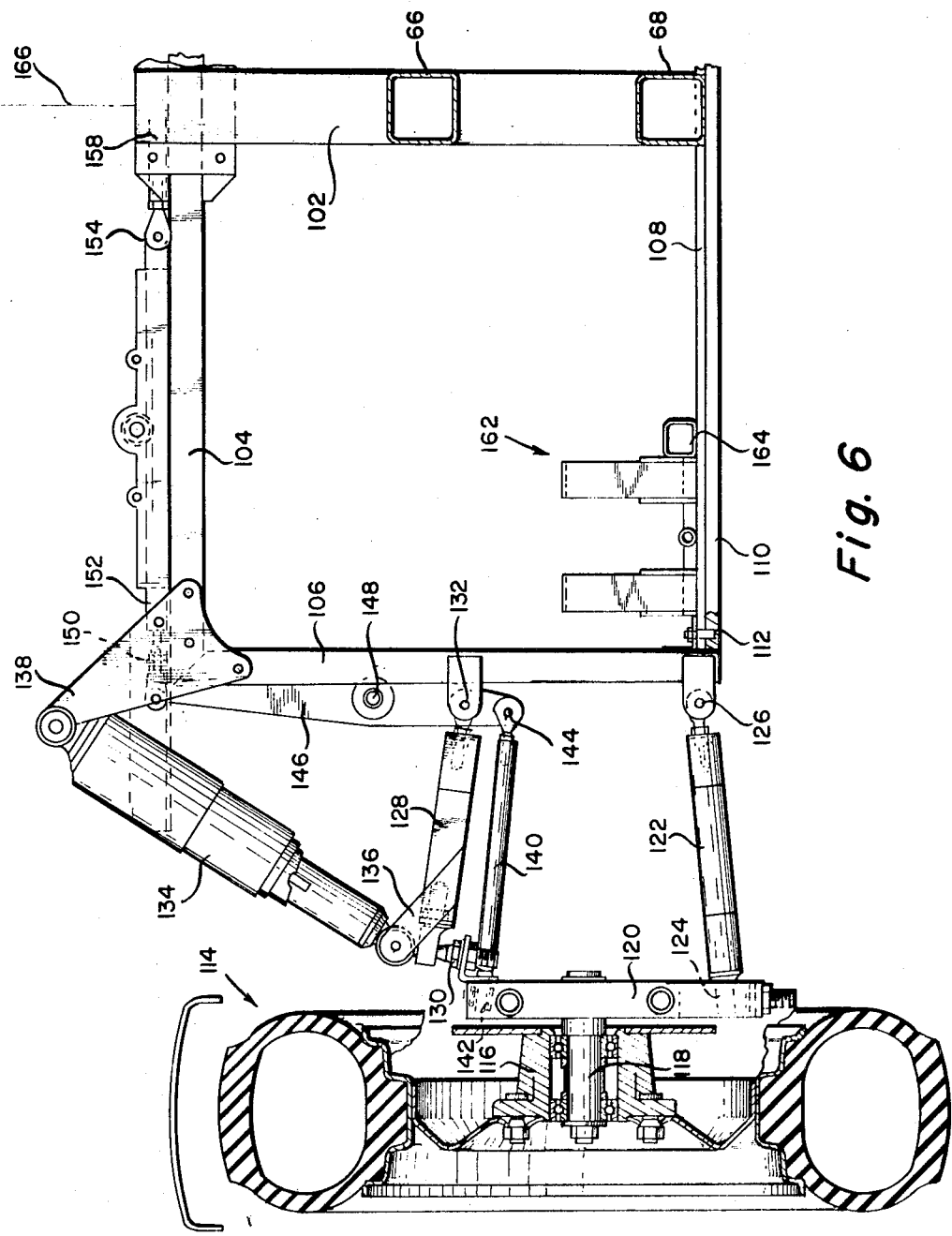

3,610,358

CYCLE CAR

SUMMARY OF THE INVENTION

This invention relates to small sports vehicles, and particularly to a three-wheeled unit.

The automotive industry has not offered a simple, high-performing, sports-type racing vehicle. The high cost of producing such a unit has been a major obstacle to placing such a vehicle on the general market.

Automotive manufacturers, particularly in Western Europe and in the Far East have been successful in making and producing low cost motorcycle and motorbike units. However, there have not been any small high-performance motorcar units available for the sporting enthusiast.

Accordingly, it is a principal object of this invention to provide a relatively high-performance and maneuverable motorcar.

It is still further object of this invention to provide such a car at a low cost.

These general objects are accomplished by using as a basic element, the relatively inexpensive two-wheel motorcycle unit. A stable, high-performing and maneuverable vehicle is obtained by adding a special two-wheeled forebody section. This section forms the front of the car and is coupled at its rear to the front of a standard two-wheel motorcycle from which the front fork and front wheel have been removed.

The forebody frame is specially constructed to provide a rigid three-wheel vehicle chassis after the forebody is connected to the motorcycle frame.

The features and advantages of the invention will become apparent from a reading of the following specification and claims.

DESCRIPTION OF THE DRAWINGS

FIG. 3 is a perspective view showing in detail the frame construction of the vehicle.

FIG. 4 is a side view showing separately the normally coupled portions of the forebody frame and the cycle frame.

FIG. 5 is a sectional view showing the special bolt arrangement used in coupling the forebody and cycle frames.

FIG. 6 is a driver's view of the front frame of the forebody and the wheel suspension thereof.

DESCRIPTION

Figure 1:
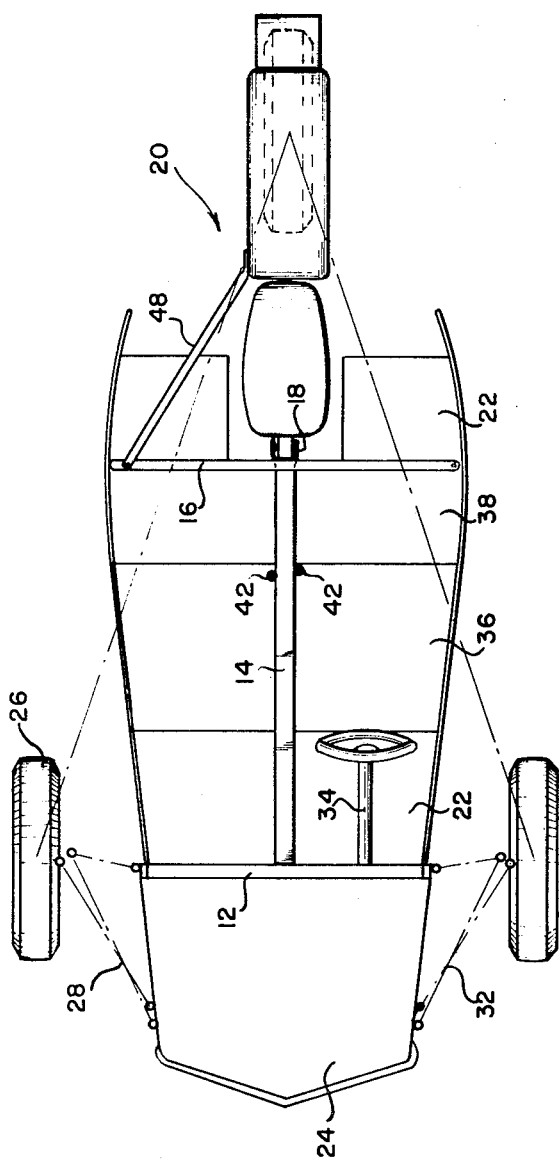
FIG. 1 is a top view of the three-wheeled vehicle illustrating the frame construction thereof.
Figure 2:
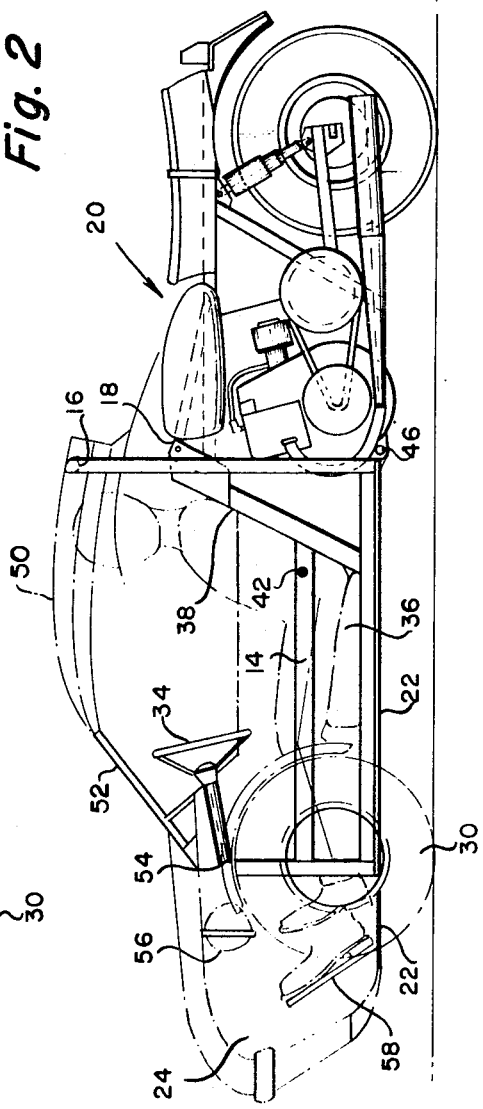
FIG. 2 is a side view of the vehicle illustrating the frame connection and showing the outline of a driver therein.

Referring particularly to FIGS. 1 and 2, the car forebody generally indicated at 10 includes a front box frame 12 disposed perpendicular and connected to a centerline frame 14, the latter being the central supporting spar of the vehicle. The third main element of the forebody 10 is the rear rollbar frame 16 which is integrally connected to the centerline frame 14 and disposed perpendicularly to it. The centerline frame is connected through a coupling flange assembly 18 to the front of a motorcycle unit which is complete except for the front wheel and front fork which have been removed.

Flooring 22 which is usually plywood is bolted along the entire bottom of the forebody frame and extends back and around a portion of the motor front of the motorcycle unit 20.

The front of the vehicle has a nose and forebody unit 24 at the side of which the right wheel 26 is disposed. Supporting linkage is indicated schematically at 28, the wheel supporting linkage being fastened to the forebody 24 and the front box frame 12. Left front wheel 30 is supported by the linkage generally indicated schematically at 32 which is supported similar to the left front linkage 28.

The steering wheel post 34 is supported on the front box frame 12.

The seat for the driver is shown at 36 and a backrest at 38. A similar seat is disposed on the other side of the center frame 14 for a passenger.

In FIG. 2 the outline of the driver indicates the relative size of the vehicle and the manner in which the driver is accommodated within the vehicle. The center of gravity noted at 42 in FIGS. 1 and 2 illustrates the location of the center of gravity when there is a driver only within the car. The center of gravity 44 in FIG. 1 illustrates the location of the center of gravity when a passenger is also in the vehicle.

The bottom coupling assembly 24 is shown in FIG. 2 and is attached to the rear bottom part of the forebody frame and the front lower portion of the cycle frame. The diagonal brace 48 shown in FIG. 1 prevents angular movement between the cycle frame 20 and the forebody 10.

In FIG. 2 a top covering 50 runs from the rollbar frame 16 forward to the windshield 52, the latter being supported at 54 on the front box frame 12 of the forebody.

The front box frame also supports the headlight 56.

The pedal assembly generally indicated at 58 is positioned in the nose and forebody 24 at a point in front of the wheels 26 and 30. The brake pedal is connected to the front and rear wheel brakes, and the accelerator is connected by linkage to the motor controls of the cycle 20.

It can be seen that the two basic elements, namely the forebody section 10 and the cycle chassis 20, are rigidly held together by the coupling assemblies 18 and 46, and the diagonal brace 48 supplies rigidity in a lateral plane. The two principal assemblies of the vehicle are bolted together and can readily be put together and taken apart without requiring further change or modification in either of the two main assemblies.

FIG. 3 shows the frame construction in detailed perspective view. The cycle chassis is indicated generally at 60. It has a front bar 62 which is connected to the upright spar 64 of the centerline frame of the forebody. The centerline frame consists of the upright spar 64, the upper horizontal centerline frame-piece 66, and the lower horizontal centerline framepiece 68.

The front bar 62 of the cycle and the upright spar 64 of the forebody centerline frame are joined together by two spaced plates 70 and 72 which are integrally connected to the upright spar 64 and are bolted to the front bar 62. This assembly is the upper coupling flange assembly 18 illustrated in FIGS. 1 and 2.

The upper portion of the front bar of the cycle chassis fits between the two securing the plates 70 and 72 with its bolts holes 74 aligned with the securing plate bolt holes 76. A bolt 78 and a bushing 80 are placed through the aligned holes and the tapered end portion 82 of the bushing and the threaded end of the bolt fit into a special configured end nut unit, as illustrated in FIG. 5. It should be noted that any type of bolt fastening can be used, but the structure shown in FIG. 5 is preferred.

In FIG. 3, it can be seen that the lower frame pieces of the cycle chassis 60 each have lugs 88 which are bolted to connecting pieces 90 which extend outwardly from the forebody rollframe lower crosspiece 92. This structure comprises the lower bottom coupling referred to in FIGS. 1 and 2.

FIG. 3 gives a rather detailed view of the frame construction. The rollbar frame consists of the lower roll frame crosspiece, the two vertical roll frame uprights 94 and 96, and the upper horizontal crosspiece 98, together with the rollbar 100 itself which is of an inverted U-shape. This frame construction is the rear rollbar frame illustrated in FIGS. 1 and 2, which is not clearly shown.

In FIG. 3, the centerline frame construction made up of members 64, 66 and 68 is designated as the centerline frame 14 of FIGS. 1 and 2.

The front box frame 12 of FIGS. 1 and 2 is shown in more detail in FIG. 3 and comprises the upright frame support 102, the upper front frame crosspiece member 104, the vertical front frame member 106, and the lower front frame cross member 108.

FIG. 6 shows a driver's view of the box frame, and illustrates the wheel mounting and steering control elements.

Referring to FIG. 6, the front crossframe member, with only the left half portion being shown, supports the flooring 110 at the bottom thereof which is bolted to the lower front frame cross member 108 by the floor bolt and bracket assembly 112. The left front wheel assembly 114 has a wheel hub and bearing assembly 116 which is supported upon the wheel shaft 118. The wheel shaft is firmly mounted perpendicularly to the wheel shaft support and linkage plate 120. The wheel shaft support and linkage plate 120 provides direct mechanical support for the wheel and brake assembly. The brake assembly is not shown. The wheel support plate is held in substantially a vertical plane by the linkage shown which is diagrammatically illustrated in FIG. 1 at 32.

FIG. 6 shows a rear view of the wheel assembly and support linkage. The lower rear support link 122 is connected to the wheel support plate 120 by the lower universal socket assembly 124. The lower rear support pivot 126 which is integrally connected to the vertical front frame member 106 supports the other end of lower support link 122.

The upper rear support link 128 is connected to the wheel support plate 120 by the upper universal socket unit 130. The other end of the upper rear support link 128 is supported on the vertical front frame member 106 by the upper rear pivotal support bracket 132.

The wheel shaft support and linkage plate 120 is pivotally supported in a vertical plane at two spaced points by the lower universal socket unit 124 and the upper universal socket unit 130. A forward supporting link not shown in FIG. 6, but indicated schematically in the linkage 32 illustrated in FIG. 1 is connected to the lower rear support link adjacent the lower universal socket unit 124 at its rear end and to the front of the forebody section 24 in its forward end. A corresponding link is connected to the upper rear support link 128 adjacent to the upper universal socket unit 130 at its rearward end, and its forward end connected to the forebody 24 at approximately the same height as the pivotal support bracket 132. This results in universal pivots 124 and 130, each being independently and pivotally supported by a simple angular linkage.

The shock absorber 134 for the wheel assembly is directly connected through link 136 to the upper rear support link 128 adjacent the universal socket unit 130. The shock absorber 134 is connected in its upper end to the shock supporting link 138 which is directly supported on the forebody crossframe members 196 and 104.

Lateral movement of the wheel shaft support and linkage plate 122 in the vertical plane about the pivots 124 and 130 is controlled by the steering link 140 which is connected to the wheel support plate 120 by the steering link pivot 142 indicated in dotted outline, which is positioned forward of the upper universal socket unit 130.

Movement of the steering link 140 is effected through the lower pivot link 144 which is attached to the lower end of steering lever 146. The steering lever 146 is pivotally supported on pivot 148 which is mounted on the vertical front frame member 106.

Transverse movement of the steering lever 146 is effected through the left transverse steering lever moving link 150, which is directly connected to the steering wheel rack and pinion assembly 152.

The right wheel support and steering assembly is identical to the left wheel assembly shown in FIG. 6.

The linkage 154 connects the right of the rack and pinion assembly to the right wheel steering control lever (similar to steering control lever 146) on the right side of the vehicle. The steering column is not shown, ut is directly connected to the pinion shown in dotted outline of the rack and pinion steering column assembly.

The instrument panel which is not shown, is mounted on support bracket 156.

The brake and pedal assembly is shown at 162, and is mounted on the brake and control pedal support to 164 forward of the lower crosspiece 108.

Having thus described my invention, what I claim is:
1. A convertible cycle car unit, comprising:
   a. a forebody including a front frame with two laterally spaced front wheels and a steering assembly connected thereto,
   b. a rear driving section including a two-wheel cycle frame, motor and controls, and a rear wheel, and
   c. said forebody front frame having a centerline frame and vertically spaced bolt means for connecting said front frame to the front of the two-wheel cycle frame which has its front fork removed.
2. The convertible cycle car as set forth in claim 1, wherein:
   a. said forebody frame includes a rollbar frame rigidly connected to a floor which is also connected to said centerline frame.
3. The convertible cycle car as set forth in claim 1, wherein:
   a. the two front wheels are approximately the same size as the cycle rear wheel, and
   b. said forebody frame accommodates passengers so that the center of gravity is slightly forward of the cycle frame and almost as low as the wheel hubs.
4. The convertible cycle car as set forth in claim 1, wherein:
   a. said forebody front frame includes a front crossframe on which the two front wheels are mounted,
   b. said front crossframe is perpendicularly disposed to and integral with the longitudinally extending centerline frame, and
   c. said cycle frame is bolted at the top and bottom front points thereof to the rear of said forebody frame.
5. The convertible cycle car as set forth in claim 1, wherein:
   a. said forebody includes a front crossframe on which the steering assembly for the wheels is crossframe and
   b. through which the legs of the driver and rider extend.
6. The convertible cycle car as set forth in claim 2, wherein:
   a. the seats for driver and passenger are disposed immediately ahead of said rollbar frame, and the seating surface is approximately as low as the wheel hubs.
7. The convertible cycle car as set forth in claim 6, wherein:
   a. a pedal control assembly is disposed within said forebody in front of said front wheels.
8. A convertible cycle car, comprising:
   a. a forebody including a front crossframe, a longitudinally extending centerline frame, and a rollbar frame,
   b. a two-wheel motorcycle, including motor, controls and rear wheel which is complete except for the front wheel and front fork,
   c. the front of said motorcycle having its frame removably connected at the top and bottom thereof to the rear of said forebody frame,
   d. the forebody frame supporting a wheel on each side of the front crossframe, each wheel being approximately equal in diameter to the rear cycle wheel, and
   e. a steering wheel and steering linkage mounted on said crossframe and connected to said wheels.
9. The convertible cycle car as set forth in claim 8, wherein:
   a. said three wheels form a triangle wherein the center of gravity of the vehicle is located approximately equidistant between the front wheels and forward of the cycle frame.
10. The convertible cycle car as set forth in claim 8, wherein:
    a. said forebody frame is made of hollow steel tubing members.
11. The convertible cycle car as set forth in claim 8, wherein:
    a. said forebody frame and said cycle frame are connected by a bolt assembly which includes two parallel spaced sideplates welded to the rear of said forebody frame and into which a front portion of said motorcycle frame is fitted.
12. The convertible cycle car as set forth in claim 8, wherein:
    a. said wheels are supported by two vertically spaced pivoted support assemblies each including a link attached to the front crossframe at one end, and
    b. the other end of each link being attached to one of two vertically spaced universal joints mounted on a wheel support plate.

13. The convertible cycle car as set forth in claim 12, wherein:
 a. a steering wheel column is mounted on said crossframe immediately in front of the driver and connected to a rack and pinion assembly mounted on said crossframe, and
 b. steering control linkage mounted on said crossframe and connected to said rack and pinion assembly at one end, and to the wheel support unit at the other end to deflect said wheel support plate.

14. The convertible cycle car as set forth in claim 13, wherein:
 a. a shock absorber is mounted on said crossframe adjacent each wheel and connected to one of said wheel support links.